N. ENGLISH.
STEAM TRAP.
APPLICATION FILED JUNE 29, 1908.

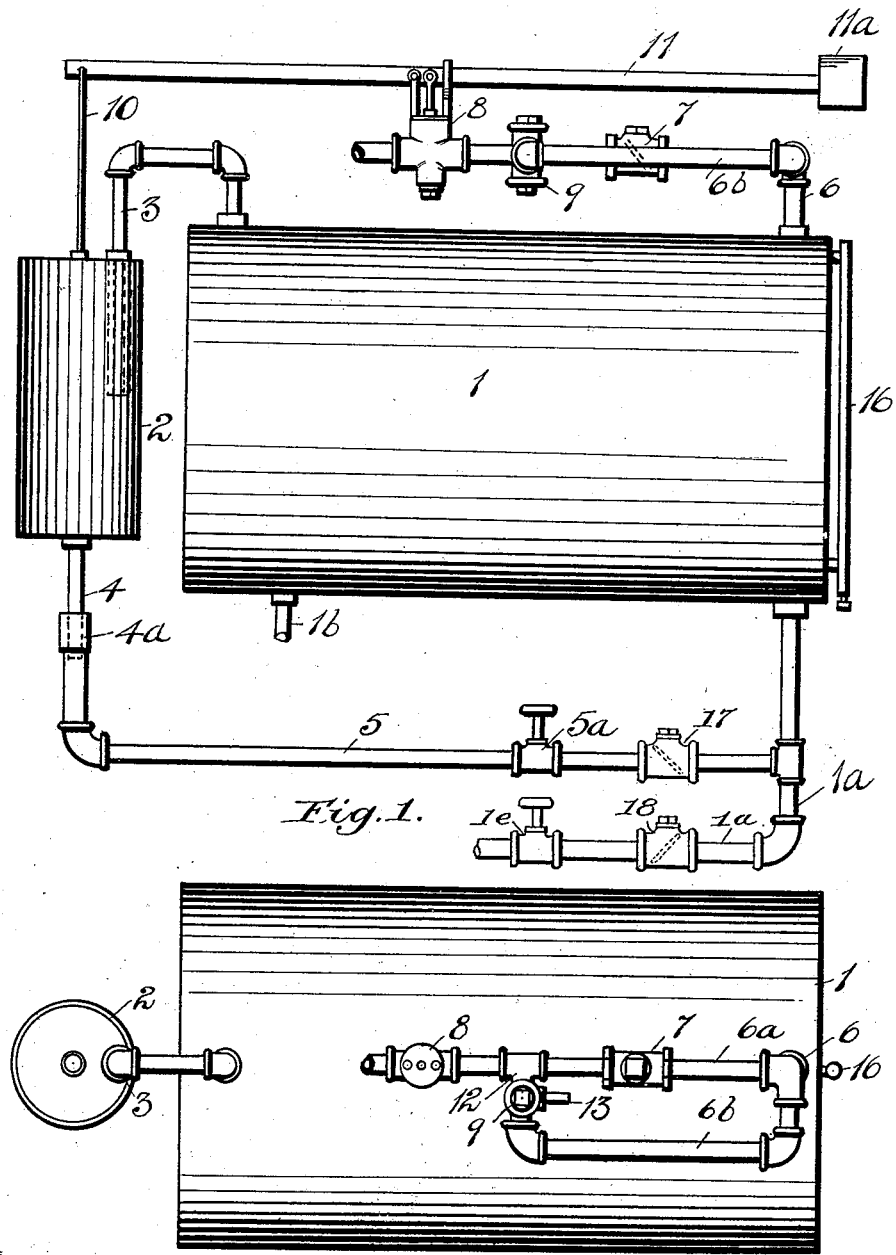

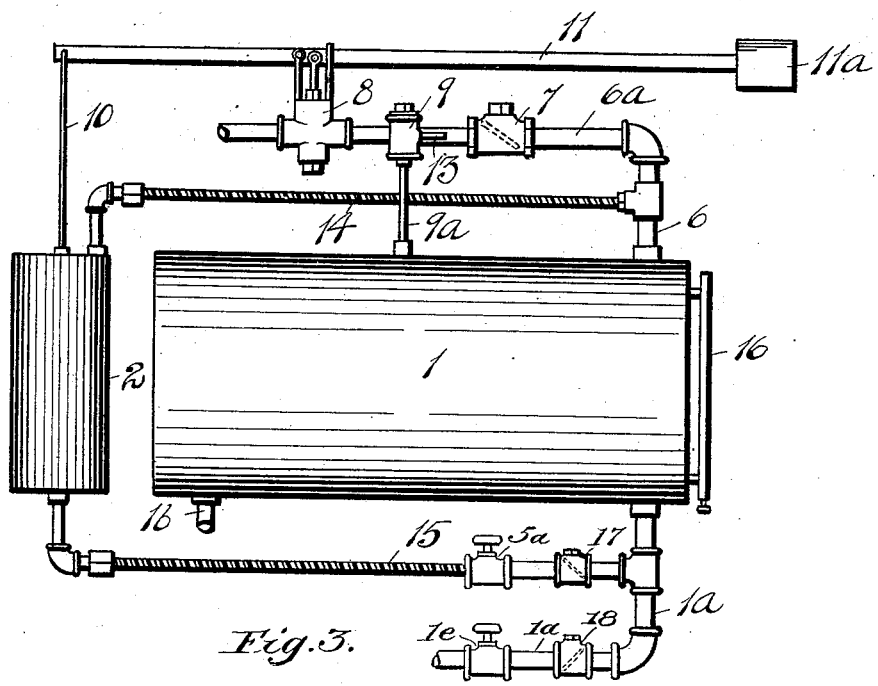
Fig. 3.
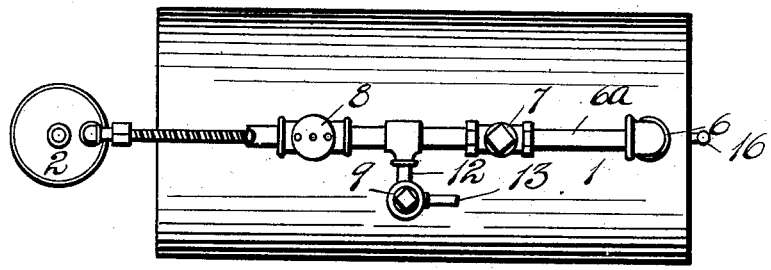
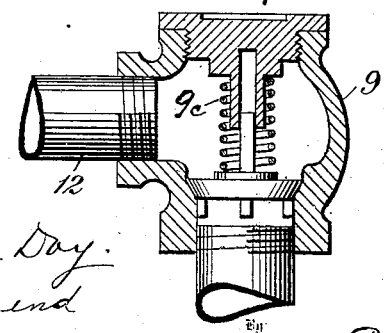
Fig. 4.
Fig. 5.

918,134.

Patented Apr. 13, 1909.
3 SHEETS—SHEET 3.

Witnesses
Clarence E. Day
Alice Townsend

Inventor
Norman English
By
Parker & Burton
Attorneys

UNITED STATES PATENT OFFICE.

NORMAN ENGLISH, OF DETROIT, MICHIGAN.

STEAM-TRAP.

No. 918,134.   Specification of Letters Patent.   Patented April 13, 1909.

Application filed June 29, 1908. Serial No. 440,790.

*To all whom it may concern:*

Be it known that I, NORMAN ENGLISH, a citizen of the United States, residing at Detroit, county of Wayne, State of Michigan, have invented a certain new and useful Improvement in Steam-Traps, and declare the following to be a full, clear, and exact description of the same, such as will enable others skilled in the art to which it pertains to make and use the same, reference being had to the accompanying drawings, which form a part of this specification.

This invention relates to steam traps, and has for its object an improved device adapted to accumulate and discharge at frequent intervals the precipitated water due to the condensation of the steam.

Figure 7:
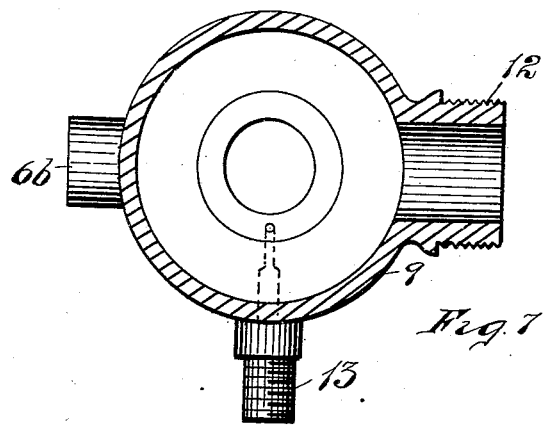
Figure 6:
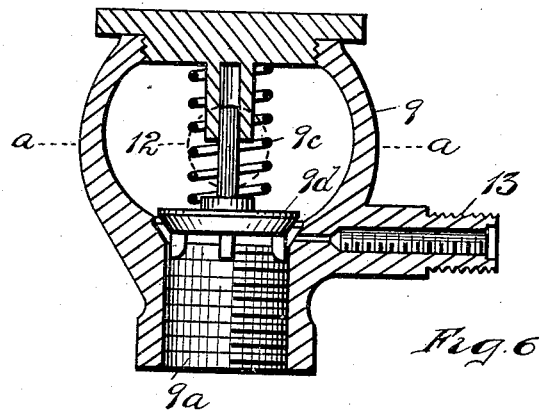

In the drawings:—Figure 1, is a front elevation of one form of the device, showing its relation to the tank and to the steam pipes. Fig. 2, is a plan view of the same, looking from above. Fig. 3, is an elevation, partly in section, of a slightly modified form of the device, wherein flexible copper hose is used as the means for conducting accumulated water from the fixed to the movable tank. Fig. 4, is a plan view of this type from above. Fig. 5, is a sectional elevation of the disk valve, whose opening or closure is dependent upon the steam pressure in the main supply pipe. Fig. 6, is a sectional elevation, on a large scale, of the disk valve used in the type of device illustrated in Figs. 3 and 4, the plane of the section shown being at right angles to that of Fig. 5. Fig. 7, is a plan view of the valve, partly in section, along the line $a—a$, Fig. 6, this type of valve being of the somewhat modified form shown in Figs. 1 and 2.

1 represents the main or fixed tank which communicates with the boiler through the medium of the pipe $1^a$, and with the steam coil through the pipe $1^b$.

2 is the closed movable tank which communicates with the interior of the tank 1 through the medium of the siphon arm, or rather elbow 3, along whose depending end portion the tank 2 is slidable. From the bottom of this tank extends a pipe 4, which is slidable within the stuffing box $4^a$, so that when the tank 2 is filled and descends, as hereinafter explained, the water, which has accumulated in the tank 2, escapes therethrough and through the pipe 5 back to the boiler. The flow of water through the pipe $1^a$ is controlled as far as its possible rearward movement is concerned, by the disk valve 18, and the flow is further manually regulatable by means of the hand actuated valve $1^e$. Similarly the outflow through the pipe 5 is controlled both by the disk valve 17 and the manually actuated valve $5^a$.

Rising from the top of the tank 1 is a pipe 6, one arm of which, $6^a$, extends horizontally above the top of the tank to communication with the boiler for the inflow of steam. This connection, and the possible flow therethrough, is regulated by two valves; one of these, 7, is a check valve, which opens freely before the onward pressure of steam, but closes at once upon its cessation, so as to prevent any backward escape thereof. The valve 8 is normally closed, but is adapted to be opened when the pull of the weight $11^a$ on the lever 11 is overcome by the weight of the water which has accumulated in the movable tank 2, which pull is communicated to the lever 11 by the link 10. As soon as the water which has accumulated in the tank 2 in such quantity as to cause its drop, and the consequent opening of the valve 8, has been discharged, the influence of the weight $11^a$ causes that end of the lever to drop once more, thus closing the valve. With the further entrance of steam into the tank 1, and its consequent pressure upon the accumulated water within the tank, terminated, the water has a renewed chance to rise in the tank under the inflow pressure from the coil connection $1^b$, and this continues until so much has accumulated therein, and has thence been siphoned into the movable tank 2 as to cause it to drop again, and open the valve 8.

Branching from the pipe 6, quite near to its point of union with the pipe $6^a$, is a second horizontal branch $6^b$, which extends for a short distance parallel with the pipe $6^a$, and directly in front of it, as viewed in Fig. 1. At the opposite end of this pipe $6^b$ from its point of union with the main pipe 6, is located a disk valve 9, the under face of which is exposed to pressure communicated to it through the medium of this pipe $6^b$, and the upper face of which is exposed to the steam pressure in the pipe $6^a$ when the valve 8 is opened by means of the pipe 12 which enters the casing of the valve 9 above the disk $9^d$, so that under the influence of steam pressure, the disk portion $9^d$ of the valve is held, at the lower limit of its travel, being additionally pressed downward by the internal spiral spring $9^c$. In this position, and during this phase, which is contemporary with the open condition of the valve 8, the steam blows off through the orifice 13, whose inner end, opening, as it does, in the sloping side wall of the valve seat, is closed when the valve member is seated thereupon. When, however, the movable tank 2 rises again, and the valve 8 is closed, steam pressure upon this exposed face of the valve 9 is terminated, for the small amount caught between the valve 8 and the valve 7 almost immediately condenses, and as a pressure force is negligible, and back pressure from the tank 1 toward the boiler being impossible because of the disk valve 7, the disk rises from its seat in spite of its weight, and against the resilience of the spring $9^c$ under the influence of the steam reaching its opposite or under face from the tank 1 through the pipe $6^b$, thus opening the orifice 13, through which the steam blows, thus relieving the pressure in the pipe $6^b$ and in the top of the tank, above the body of water, which is steadily being added to through the inflow through the coil pipe $1^b$, and thus to a degree forces back the stored steam still remaining in the tank.

In the type illustrated in Figs. 3 and 4, the arrangement as to the main tank 1, pipe 6 and arm $6^a$, and its related portions, is identical with that shown in Fig. 1, but in place of the siphon elbow 3, and of the pipe $6^b$, in communication with the pipe 6, sections of flexible copper hose 14 and 15 are used to connect the interior of the tank 2 with the tank 1. The tank 2 is still capable of relative vertical motion with respect to the tank 1, and its movement is imparted to the lever 11 by the same link 10, but instead of sliding along the siphon arm, the flexibility of the sections of hose permits them to follow the vertical movements of the tank 2. The valve 9 is connected directly to the tank 1 by a pipe $9^a$, instead of through the medium of the pipe $6^b$; it has the same short connection 12 with the pipe $6^a$, as the type shown in Fig. 1, so that the unseating of its disk, and the consequent "blow-off", due to the admission of steam upon the closing of the valve 8, occur the same as before. In both types, it is desirable, though not necessary, to attach a glass 16 to the tank 1, in order that the height of water therein may be easily observed.

What I claim is:—

1. In a steam trap, in combination with a fixed tank, an escape pipe leading therefrom back to the boiler, a pipe through which water may enter the tank from a steam coil, a main steam pipe leading into the tank from the boiler, a check valve therein whereby the backward flow of steam is prevented, a second valve normally closed whereby the flow of steam therethrough may be controlled, a weighted lever controlling the opening and closure of the valve, a movable tank linked to said lever at about the level of the fixed tank whereby the lever is actuated by the travel of said movable tank, connections between the movable tank and the first tank whereby relative movement thereof with respect to the same is permitted, and a disk valve in communication with said main steam pipe adapted to be held closed by steam pressure and to open upon the cessation thereof to release the steam remaining in the main pipe and in the tank after its further flow has been terminated by the closure of said second valve, substantially as described.

2. In a steam trap, the combination of a fixed tank adapted to receive the water of condensation from a steam coil, an escape pipe therefrom leading back to the boiler, a valve therein whereby the backflow of steam therethrough is prevented, a steam pipe leading into the tank from the boiler, a valve normally closed controlling the flow therethrough, a lever whereby the same may be actuated, a movable tank having a link connection with said lever, and supported therefrom at one side of the said fixed tank whereby the actuation due to its travel is communicated to the lever to effect the opening and closure of said valve an escape valve in communication with said steam pipe and with the interior of the tank, adapted to be held closed by pressure of steam upon its upper face when said normally closed valve is opened, and to be opened by pressure of steam from the tank upon its opposite face upon the cessation of steam pressure entering past said normally closed valve, because of the closing thereof, pipe connections between said fixed tank and said movable tank, whereby water and steam may flow from the fixed tank into the movable tank regardless of the location of the movable tank in its possible path of travel, a pipe leading from said movable tank toward the boiler, and a valve therein for regulating the flow therethrough, substantially as described.

In testimony whereof, I sign this specification in the presence of two witnesses.

NORMAN ENGLISH.

Witnesses:
VIRGINIA C. SPRATT,
WILLIAM M. SWAN.